May 21, 1935.  F. W. MILLER  2,002,327
ALARM WATER COLUMN
Filed Aug. 21, 1933
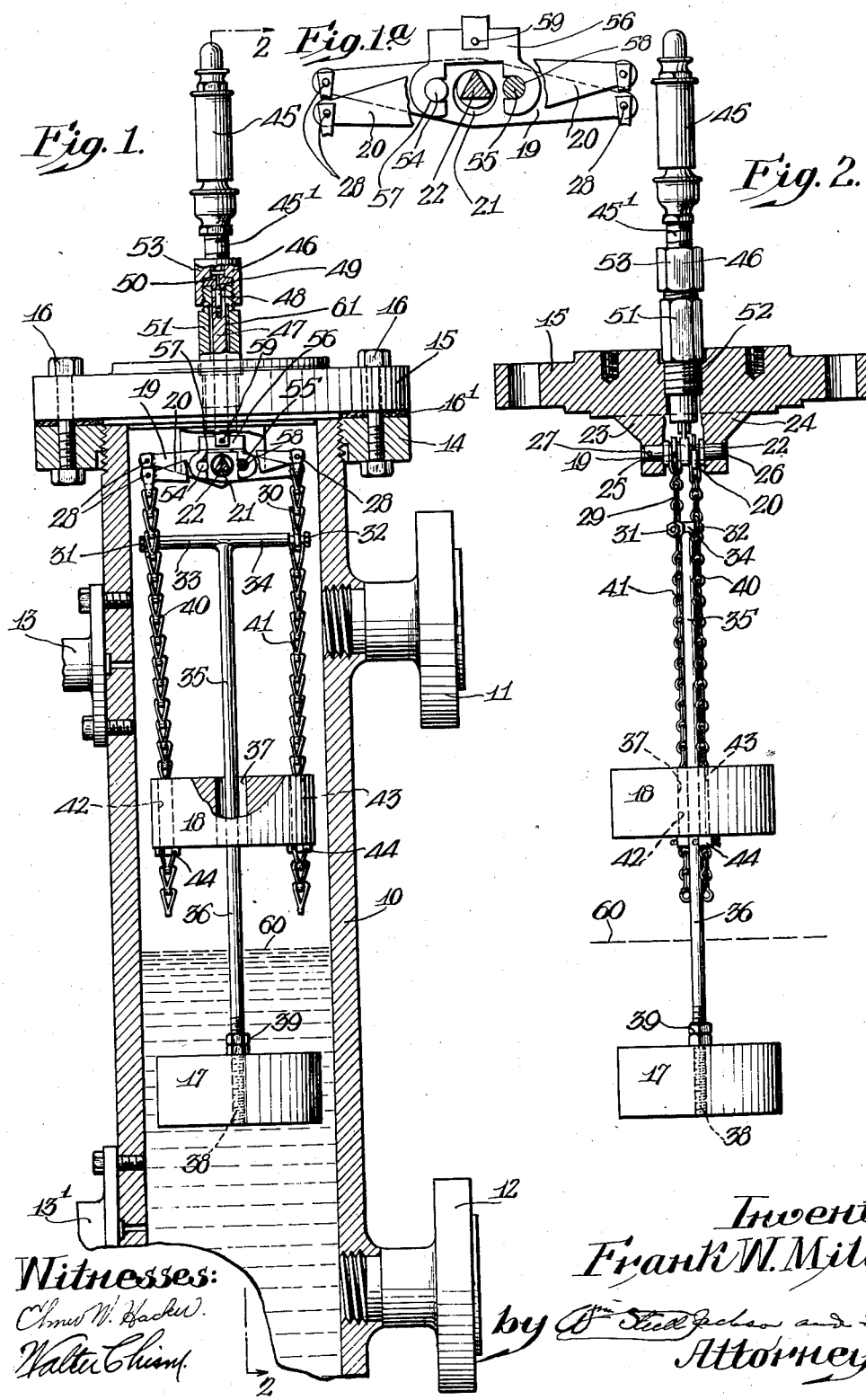
Inventor
Frank W. Miller Patented May 21, 1935

2,002,327

UNITED STATES PATENT OFFICE 2,002,327

ALARM WATER COLUMN

Frank W. Miller, Philadelphia, Pa., assignor to Yarnall-Waring Company, Philadelphia, Pa., a corporation of Pennsylvania Application August 21, 1933, Serial No. 686,108

1 Claim. (Cl. 137—102)

My invention relates to indicating mechanism for disclosing a condition of abnormally high or abnormally low liquid level in a boiler or similar device.

A purpose of my invention is to prevent the possibility of leakage from a boiler alarm, while at the same time simplifying the construction and improving the operation of the alarm.

A further purpose is to suspend the balance levers of a boiler alarm directly from the cap of the alarm body.

Further purposes will appear in the specification and in the claim.

In the drawing I have illustrated only one of the possible embodiments of my invention, selecting a form which is convenient in operation, easy to manufacture and satisfactory in illustration of the principles involved.

Figure 1 is a partially sectioned side elevation of my improved boiler alarm.

Figure 1a is a fragmentary enlargement of Figure 1.

Figure 2 is a section of Figure 1 upon the line 2—2, the weights and suspension being shown in elevation and the alarm body being omitted.

In the drawing like numerals refer to like parts.

The illustrated boiler alarm comprises an alarm body 10 having high and low boiler connections at 11 and 12 desirably threaded into the body 10, and having side connections at 13 and 13' for a water gauge, not shown. The alarm body is flanged at the top at 14 for engagement with a cap 15. The flange 14 may be desirably threaded to the remainder of the body 10. The cap is held in place by bolts 16, and the joint is packed by a gasket 16'.

Within the body 10, solid weights 17 and 18 are supported from balance levers 19 and 20 which have openings 21, through which a knife edge support 22 for both levers extends. Lugs 23 and 24, integral with the cap 15, are provided with openings 25 and 26 to receive the ends of the knife edge support 22. Rotation of the support 22 is prevented by a pin 27, passing through the lug 23.

The weights 17 and 18 are supported from the balance levers 19 and 20 by chains secured to pivoted fasteners 28 on the ends of the balance levers. The support for the weight 17 comprises a chain 29 secured to one end of the balance lever 19, through a pivoted fastener 28, and a chain 30 secured to the opposite end of the balance lever 20, through another pivoted fastener 28. The chains 29 and 30 are fastened at 31 and 32 to the respective arms 33 and 34 of a T-rod 35 having a downwardly extending portion 36 which passes through an opening 37 in the weight 18. The lower end of the T-rod 35 is adjustably threaded at 38 to the weight 17, and lock nuts are provided to secure the weight 17 at any setting.

The weight 18 is supported by a chain 40 secured to one end of the balance lever 20, through a pivotal fastener 28, and by a chain 41 secured to a pivotal fastener 28 on the other end of the balance lever 19. The lower ends of the chains pass through openings 42 and 43 in the weight 18 and are adjustably secured at 44.

The whistle 45 is operated from the pressure of the boiler or similar device through the balance levers 19 and 20 by a suitable valve 46, comprising a valve plunger 47, having a needle 48, and a valve seat 49 provided with an opening 50.

The valve seat 49 is held in place by cooperating threads on a valve casing 51, surrounding the plunger 47 and threaded into the alarm cap 15 at 52, and a sleeve 53 threaded to a nipple 45' extending from the lower end of the whistle 45.

Each of the balance levers 19 and 20 carries a pin 54 or 55, which extends into the space between the levers and engages an end of a yoke 56 having slots 57 and 58 to receive and engage the pins 54 and 55.

The yoke 56 is connected to the lower end of the needle valve plunger 47 by a pivot pin 59.

The normal liquid level 60 is between the positions of the two weights 17 and 18. The weight 17 is normally submerged, while the weight 18 is normally above the liquid level. Should the liquid level drop so that the weight 17 becomes exposed above the liquid, the liquid will cease to buoy the weight 17 and the pull of gravity upon it will become more effective, upsetting the balance of the balance levers and causing the respective ends of the levers supporting the weight 17 to move down, thus moving the pins 54 and 55 down, and lowering the yoke 56, the needle valve plunger 47 and the needle 48. Accordingly, steam or other vapor or gas is admitted from the alarm body 10 through the annular space 61 around the valve plunger 47, through the opening 50 of the valve seat 49, and into the whistle 45, causing the operation of the whistle.

Return of the liquid level to its normal position closes the valve and causes the whistle to cease to operate.

If the liquid level rises above the normal value, the upper weight 18 will be submerged, and buoyed by the water, so that the downward force exerted by it on the balance levers will decrease. In effect, this is the same as increasing the downward force exerted by the weight 17, and the balance levers will move as before to operate the whistle. Return of the liquid level to its normal position will close the needle valve and shut off the whistle.

The lugs 23 and 24 offer a very desirable means for holding the knife edge support 22. The only possibility of steam escape from the plunger is through the needle valve, and this may be prevented by properly grinding the valve. The valve casing 51 is tightly screwed into the alarm cap, so as to avoid leakage at this point.

While the whistle is the most convenient indicating means for ordinary purposes, another indicating means responsive to pressure may be used.

It will be noted that the chain suspension of the weights adds greatly to the flexibility of the mechanism, thus offering an advantage over the rod suspension which is now common.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

In a liquid level alarm, an alarm body having a cap and having spaced integral lugs extending below the cap, a knife edge support held by the lugs and extending between them, a pair of balance levers centrally pivoted side by side on the knife edge support, high and low weights spaced respectively above and below the intended normal level of liquid within the body depending from opposite arms of the balance levers, a valve operating axially vertically above the knife edge axis, indicating means controlled by the valve and a mechanical connection between the valve and the balance levers for operating the valve, said mechanical connection including a yoke pivoting to the respective balance levers on opposite sides thereof at points thereof equidistant form the knife edge, the weights, yoke and valve being dimensioned so that, with the high weight above and the low weight below the liquid level within the body, the greater downward force of the high weight as compared to that of the low weight will be adapted to hold the valve closed, while, with partial emersion or immersion respectively of the low or high weight, will be adapted to respectively so increase the opposing downward pull of the low weight or diminish the downward pull of the high weight as to angularly move the levers to open the valve.

FRANK W. MILLER.